Patented July 23, 1940

2,209,169

UNITED STATES PATENT OFFICE 2,209,169

PROCESS FOR THE PREPARATION OF OIL SOLUTIONS OF ORGANIC SULPHONATES

Louis A. Mikeska, Westfield, and George E. Serniuk, Elizabeth, N. J., assignors to Standard Oil Development Company, a corporation of Delaware No Drawing. Application March 25, 1939, Serial No. 264,114

6 Claims. (Cl. 252—6)

This invention relates to a process for preparing improved oil soluble organic sulphonates and oil solutions thereof. It relates especially to the preparation of improved solutions of organic sulphonates of high wetting and detergent power, in viscous oils, the solutions being suitable for use as textile oils and as agricultural sprays.

Organic sulphonates having highly effective wetting and detergent action have already been prepared by reaction of unsaturated organic compounds with sulphonating agents. Examples of such sulphonates are the alkyl phenol sulphonic acids and their salts, prepared by sulphonating an alkyl phenol or by condensing a phenol with an alkylating agent such as an olefin or alcohol under sulphonating conditions; in either case the resulting sulphonic acid may be neutralized with a suitable base such as an alkali hydroxide or carbonate to prepare the corresponding salt. Other examples are the alkyl sulphonic acids and their salts, prepared by sulphonating an olefin and neutralizing the resulting sulphonic acid derivative. The desired organic sulphonates having high wetting and detergent properties for use in this invention contain preferably above about 8 to 30 carbon atoms in the organic group attached to the sulphonic acid radical, while in especially desirable compounds the organic group contains about 12 to 22 carbon atoms of which not more than 6 are in an aromatic nucleus.

In the preparation of such organic sulphonates by reaction of suitable organic compounds with a sulphonating agent the resulting products contain materials which are insoluble in hydrocarbon oils and which may be separated from the crude products only with difficulty and with a substantial reduction in yields. A process has now been found for preparing such sulphonates in a highly purified form free of oil insoluble materials and giving a clear solution in viscous hydrocarbon oils. This process is illustrated in the following examples.

Example 1

To a mixture of 56 grams of di-isobutylene and 23 grams of phenol, there was added dropwise, with stirring, a total of 3 cc. of 96% strength sulphuric acid. Upon the addition of a few drops of the acid the reaction temperature increased from 30 to 40° C. The mixture was then cooled to prevent the temperature from going above 40° C. throughout the remainder of the reaction. The mixture was stirred for one hour after the addition of this acid was completed and there was then added 25 cc. more of 96% strength sulphuric acid. The reaction mixture became very viscous on this second addition of acid and 25 cc. of 54° refined, acid-inert petroleum naphtha was added to reduce the viscosity. The mixture was stirred for four hours at 30° C., following this second addition of acid 300 grams of a refined petroleum oil having a viscosity of 90 to 100 seconds Saybolt at 100° F. and a color of 15 Robinson was added. The mixture was well stirred and then transferred into a separatory funnel where it was permitted to stand for several hours at room temperature. The lower aqueous acid layer, amounting to 31.2 grams was drawn off. The oil solution of the sulphonated product was then neutralized by pouring it slowly into 45 cc. of a 30% strength aqueous solution of sodium hydroxide, with stirring. The neutralized solution was then heated to 100° C. and carbon dioxide gas was bubbled through the solution until all water was evaporated and the excess sodium hydroxide was precipitated as the carbonate. The solution was then cooled to room temperature and filtered. There was thereby obtained a clear oil solution of the alkyl phenol sodium sulphonate which had a color of 9R on No. 2 glass in the Robinson test. This solution was suitable for use directly as a textile oil.

Example 2

A half liter, three-way flask was fitted with a mechanical stirrer, drop funnel and thermometer. A mixture of 95 grams of tri-isobutylene and 47 grams of phenol was placed in the flask. 0.03 gram mols of 96% strength sulphuric acid was then added dropwise with stirring and cooling to hold the reaction temperature below about 40° C. and the mixture was then stirred for one-half hour. 74 grams of 96% strength sulphuric acid was then added dropwise with stirring over a period of one hour while cooling to hold the reaction temperature between 40 and 50° C. After all of the acid was added, the materials were further stirred for two hours at 50° C. The mixture was then added to 700 grams of a refined petroleum oil having a viscosity of 80 to 90 seconds Saybolt at 100° F. and a color of plus 30 Saybolt, and this mixture was heated to 70° C. with stirring, and then transferred to a separatory funnel in which it separated into three layers, a lower acid layer, a small darker middle layer and a large lighter colored upper layer. The lower layer of spent aqueous acid was withdrawn. It amounted to 17 cc., or 28 grams.

The remaining oil layers were then neutralized by addition of 80 cc. of 30% strength aqueous sodium hydroxide solution with stirring. The mixture was then heated to 100 to 110° C. and carbon dioxide gas was blown through it at this temperature for two hours in order to remove excess alkali and water. The solution was then cooled and filtered. There was thus obtained as filtrate a clear, light colored solution of 140 grams of tri-isobutyl phenol sodium sulphonate in the hydrocarbon oil. If the small dark layer is removed prior to neutralization, a solution of somewhat better color is obtained, but the yield is thereby somewhat reduced.

*Example 3*

A one liter, three-way flask fitted with a mechanical stirrer, drop funnel and thermometer was charged with 112 grams of tetra-isobutylene. To the well stirred olefin was then added dropwise over a period of one-half hour a mixture of 58.3 grams (1 mol) of chlorsulphonic acid and 52.1 grams (1.4 mols) of anhydrous ethyl ether, dried over sodium. The temperature during this particular addition was maintained at 30 to 35° C. and the stirring of the materials was continued for two and one-half hours at the same temperature after the addition of the chlorsulphonic acid-ethyl ether complex was completed. The mixture was then heated gently to evaporate the ether, until the reaction product became water soluble (observed by removing small portions and testing in water). The reaction product was then added to 500 grams of a refined petroleum oil having a viscosity of 80 to 90 seconds Saybolt at 100° F. and a color of plus 30 Saybolt. After stirring, the mixture was neutralized by addition of 135 cc. of a 30% strength aqueous sodium hydroxide solution and was then permitted to stand for several hours, whereupon two layers formed, the lower being primarily an aqueous solution of inorganic salts and the upper being mainly an oil solution of the alkyl sodium sulphonate. The entire material was then well stirred and heated to 90 to 110° C. A steady stream of carbon dioxide gas was passed through the mixture at this temperature for two and one-half hours to remove all moisture, to complete the solution of the soap, and to precipitate excess sodium hydroxide as carbonate. The mixture was then cooled to room temperature and filtered. The filtrate was clear and had a very faint straw color. It amounted to 617 grams, containing 117 grams of tetra-isobutenyl sodium sulphonate.

This oil solution produced foam when shaken with water but did not emulsify to any great extent. A mixture of this oil solution with the oil solution of tri-isobutyl phenol sodium sulphonate prepared in Example 3 emulsified readily when shaken with water and also produced much foam. Oil solutions containing both the alkyl sulphonates and the alkyl phenol sulphonates prepared according to the process of this invention are thus particularly desirable for preparing textile oils.

Improved organic sulphonates may also be prepared according to the process of this invention from other organic reagents and sulphonating agents, those used in the above examples being intended to illustrate this invention.

The oil solutions prepared in the above examples are considerably more concentrated than necessary for use as agricultural sprays or textile oils, and are preferably used as concentrates, from which the industrial oils are prepared simply by dilution with a suitable oil for the intended use. Sufficient oil is preferably added during the process described herein to prepare a concentrate containing about 10 to 50% of the organic sulphonate. In preparing textile oils from such concentrates, a suitable textile oil is added thereto in sufficient amount to produce a textile oil composition containing from about 0.1% to 5% of the organic sulphonate, a concentration of about 1 to 2% generally being preferred. Agricultural spray oil compositions may be similarly prepared, and contain about 0.1 to 10% of the organic sulphonate, a concentration of about 1% generally being suitable.

Suitable sulphonating agents include strong and fuming sulphuric acid, chlorsulphonic acid and solutions of sulphur trioxide in suitable vehicles such as liquid sulphur dioxide, while numerous diluents and materials forming complexes with the sulphonating agent, such as the sulphur trioxide-sulphur dioxide complex and the chlorsulphonic acid-ethyl ether complex, may also be used. Such materials are preferably of such volatility that they are removed during the drying operation, which is conducted by blowing carbon dioxide, air or inert gases through the oil solution at a temperature insufficiently high to cause decomposition or color formation. This temperature is preferably below about 110° C. although somewhat higher temperatures may be used. Carbon dioxide is preferred for this purpose as it serves to neutralize any excess of alkali present. It may be used alone or in a mixture with other gases.

Organic materials suitable for use in place of the olefins and phenol used in the above examples include unsaturated organic compounds having above about 10 carbon atoms per molecule and capable of combining with the sulphonating agents to form organic sulphonates. Such materials include aromatic hydrocarbons, phenols, the alkyl derivatives of either, olefins and olefin polymers, especially those having at least half the carbon atoms in a straight chain, and the isobutylene polymers such as di-isobutylene, tri-isobutylene and tetraisobutylene, also the copolymers of isobutylene with other olefins, particularly the butenes, also other unsaturated cyclic compounds, such as the naphthenes, all such compounds being characterized by having at least one olefinic linkage.

The reaction product containing the desired organic sulphonate may be neutralized with any suitable alkali, such as sodium or potassium hydroxide, carbonate or bicarbonate or calcium or magnesium oxide or hydroxide. While such neutralizing agents may be used in dry form, they are preferably supplied in fairly concentrated aqueous solution or in the form of a slurry containing the neutralizing agent in a very fine state of subdivision in order to secure intimate contact with the products of the sulphonating reaction.

The nature of the viscous hydrocarbon oil added to the products of the sulphonating reaction will, in general, be determined by the characteristics desired in the resulting oil solution. For the preparation of textile oils, the oil should be a refined, stable petroleum fraction of light color above about 10R and preferably above about 15 Robinson, and having a viscosity of about 50 to 150 seconds Saybolt at 100° F., preferably about 80 to 100 seconds Saybolt at 100° F. For the preparation of agricultural summer sprays the oil used is preferably a highly refined petroleum oil containing at least 90% of unsulphonatable residue (with 90% strength sulphuric acid) and has a viscosity of 75 to 100 seconds Saybolt at 100° F. Winter spray oils should contain at least 60 to 80% of unsulphonatable residue and may have a viscosity of about 75 to 125 seconds Saybolt at 100° F.

This invention is not to be limited by any specific examples or explanations presented herein, all being intended solely for purpose of illustration, as numerous modifications of the process described herein, within the scope of this invention, will be apparent to one skilled in the art. It is my desire to claim all novelty disclosed herein insofar as the prior art permits.

We claim:

1. Process for preparing a substantially salt-free solution of organic sulphonates in viscous hydrocarbon oils, comprising forming an organic sulphonate having at least 10 carbon atoms in the organic radical by bringing a suitable unsaturated organic compound into reaction with a sulphonating agent, adding a viscous hydrocarbon oil to the reaction mixture, neutralizing the reaction mixture with an alkali, drying the resulting oil solution of the organic sulfonate salt and filtering the dried solution.

2. Process according to claim 1 in which the said oil solution of the organic sulphonate salt is dried by blowing with a gas which is inert to said sulphonate salt.

3. Process according to claim 1 in which the said oil solution of the organic sulphonate salt is dried by blowing with carbon dioxide gas.

4. Process according to claim 1 in which the said oil solution of the organic sulphonate salt is dried by blowing with carbon dioxide at a temperature of about 90 to 110° C.

5. Process for preparing a clear solution of an organic sulphonate salt in a viscous hydrocarbon oil, comprising bringing an unsaturated organic compound into reaction with a sulphonating agent to form an organic sulphonic acid having at least 10 carbon atoms in the organic radical, adding a viscous hydrocarbon oil to the reaction products, neutralizing the reaction products with an aqueous solution of an alkali in slight excess, drying the neutralized mixture by blowing carbon dioxide gas through it at an elevated temperature, cooling the dried mixture and filtering solid material therefrom.

6. Process for preparing a clear solution of an organic sulphonate salt in a viscous hydrocarbon oil comprising bringing an unsaturated organic compound having above about 8 to 30 carbon atoms into reaction with a sulphonating agent whereby said organic compound is sulphonated to form an organic sulphonic acid having from above about 8 to 30 carbon atoms in the organic radical, adding a hydrocarbon oil having a Saybolt viscosity of about 50 to 150 seconds at 100° F. to the reaction products, neutralizing the reaction products with sodium hydroxide, drying the resulting oil solution of the organic sulphonate salt and filtering the dried solution.

LOUIS A. MIKESKA.
GEORGE E. SERNIUK.